(12) United States Patent
Liu

(10) Patent No.: US 7,654,376 B2
(45) Date of Patent: Feb. 2, 2010

(54) CLUTCH CAPABLE OF CUSHIONING FORWARD MOVEMENT AND GUARDING BACKWARD MOVEMENT

(76) Inventor: Jen-Chih Liu, 235 Chung - Ho Box 8-24, Taipei, Kaohsiung City (TW)

( * ) Notice: Subject to any disclaimer, the term of this patent is extended or adjusted under 35 U.S.C. 154(b) by 408 days.

(21) Appl. No.: 11/519,491

(22) Filed: Sep. 12, 2006

(65) Prior Publication Data
US 2008/0060898 A1    Mar. 13, 2008

(51) Int. Cl.
*F16D 11/14* (2006.01)
(52) U.S. Cl. .................................. 192/69.91; 192/52.6
(58) Field of Classification Search ............. 192/69.91, 192/69.9
See application file for complete search history.

(56) References Cited
U.S. PATENT DOCUMENTS
4,281,749 A * 8/1981 Fogelberg ................. 192/69.4

5,997,428 A    12/1999 Kagata et al.

\* cited by examiner

*Primary Examiner*—Rodney H Bonck

(57) ABSTRACT

A clutch capable of cushioning forward movement and guarding backward movement comprises a first mandrel, a second mandrel, a clutch sleeve, a driving stick, a clutch ring, a cushioning springs and a safety springs. The first mandrel further comprises an engagement gear surface formed on the section close to the second mandrel for the engagement with the clutch sleeve mounted on the second mandrel. The clutch sleeve is driven by the driving stick to shift longitudinally. The clutch ring is slidably mounted on the clutch sleeve, having a cushioning mechanism with the clutch sleeve. The safety springs and the cushioning springs are included in the cushioning mechanism for slowing down the engagement between the clutch ring and the engagement gear surface on the first mandrel when the driving stick drives the clutch sleeve but they are not precisely aligned.

4 Claims, 5 Drawing Sheets

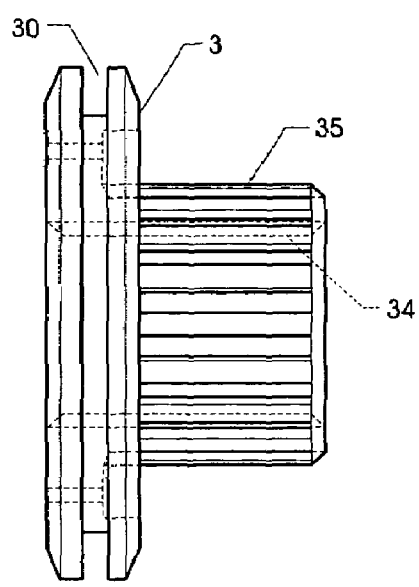
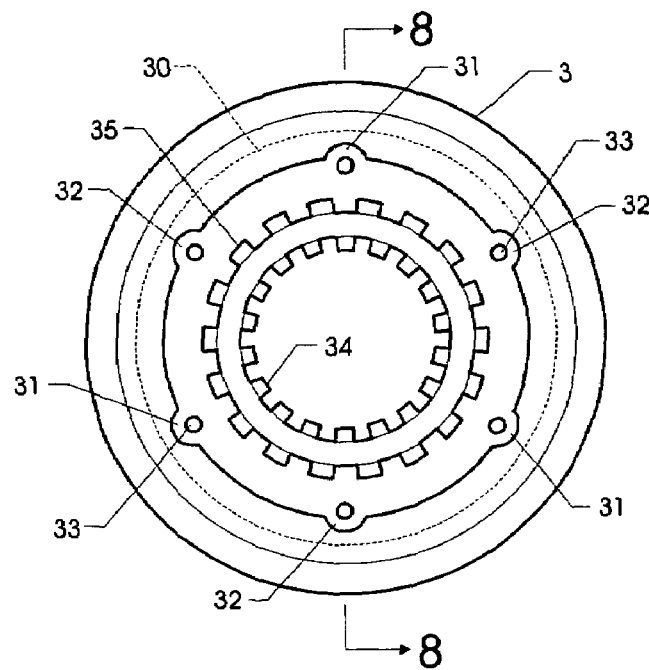
FIG. 5
FIG. 6
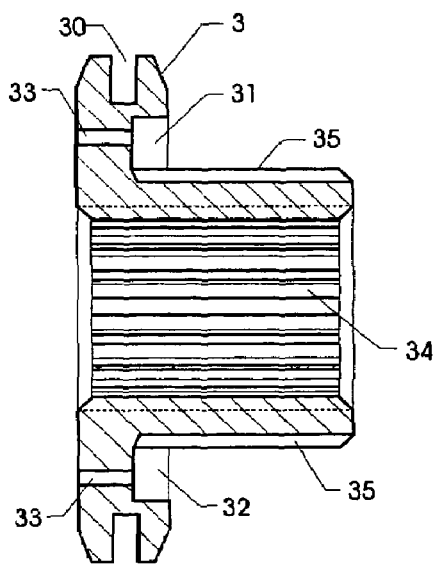
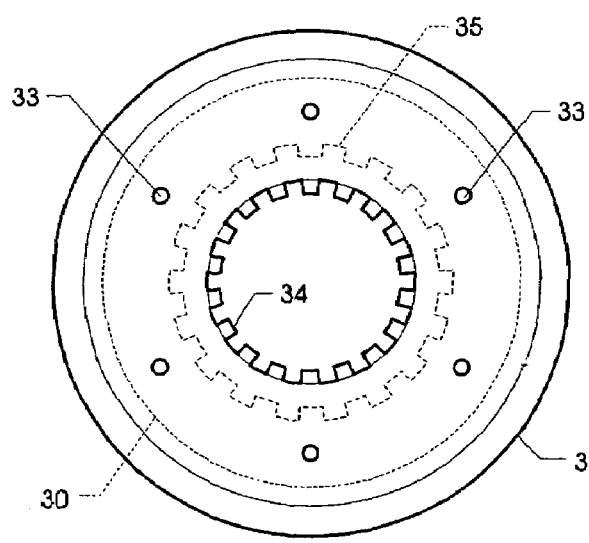
FIG. 8
FIG. 7

CLUTCH CAPABLE OF CUSHIONING FORWARD MOVEMENT AND GUARDING BACKWARD MOVEMENT

FIELD OF THE INVENTION

The present invention relates to clutches for shaft transmission, more particularly to a clutch capable of cushioning forward movement and guarding backward movement.

BACKGROUND OF THE INVENTION

Clutches for shaft transmission in two wheel drive and four wheel drive automobiles of the prior art, such as the one disclosed by U.S. Pat. No. 5,997,428, utilize a driving stick to control the separation of two rotational shafts, whereby the mechanical power can be transported from one shaft to another.

However, the problem of instantaneous misalignment between the sleeve driven by the driving stick and the gears on a second shaft is solved by an external cushioning mechanism in the prior art, which takes extra space and increases manufacturing cost.

SUMMARY OF THE INVENTION

The primary objective of the present invention is to provide a clutch capable of cushioning forward movement and guarding backward movement having the advantages of:
1. simple structure;
2. small size;
3. having a cushioning mechanism that prevents damages to transmission components when gear wheels cannot be engaged or separated; and
4. therefore having more durable parts.

The various objects and advantages of the present invention will be more readily understood from the following detailed description when read in conjunction with the appended drawings.

To achieve above object, the present invention provides a clutch capable of cushioning forward movement and guarding backward movement which comprises a clutch capable of cushioning forward movement and guarding backward movement. The clutch comprises a first mandrel further comprising an engagement gear surface on one end thereof; a second mandrel; a clutch sleeve mounted on an end section of said second mandrel close to said first mandrel for engaging said engagement gear surface on said first mandrel; a driving stick driving said clutch sleeve to move longitudinally; a clutch ring slidably mounted on said clutch sleeve, having a cushioning mechanism with said clutch sleeve; a cushioning springs disposed in said cushioning mechanism for facilitating the engagement between said clutch ring and said engagement gear surface on said first mandrel when said clutch sleeve and said clutch ring are not precisely aligned due to a driving stick shift; and a safety springs disposed in said cushioning mechanism for facilitating the engagement between said clutch ring and said engagement gear surface on said first mandrel when said clutch sleeve and said clutch ring are not precisely aligned due to a driving stick shift.

BRIEF DESCRIPTION OF THE DRAWINGS

FIG. 5 shows the clutch sleeve of the present invention.

FIG. 6 is a right side view of the clutch sleeve in FIG. 5.

FIG. 7 is a left side view of the clutch sleeve in FIG. 5.

FIG. 8 is the 8-8 lateral cross-section of the clutch sleeve in FIG. 6.

DETAILED DESCRIPTION OF THE PREFERRED EMBODIMENTS

Figure 1:
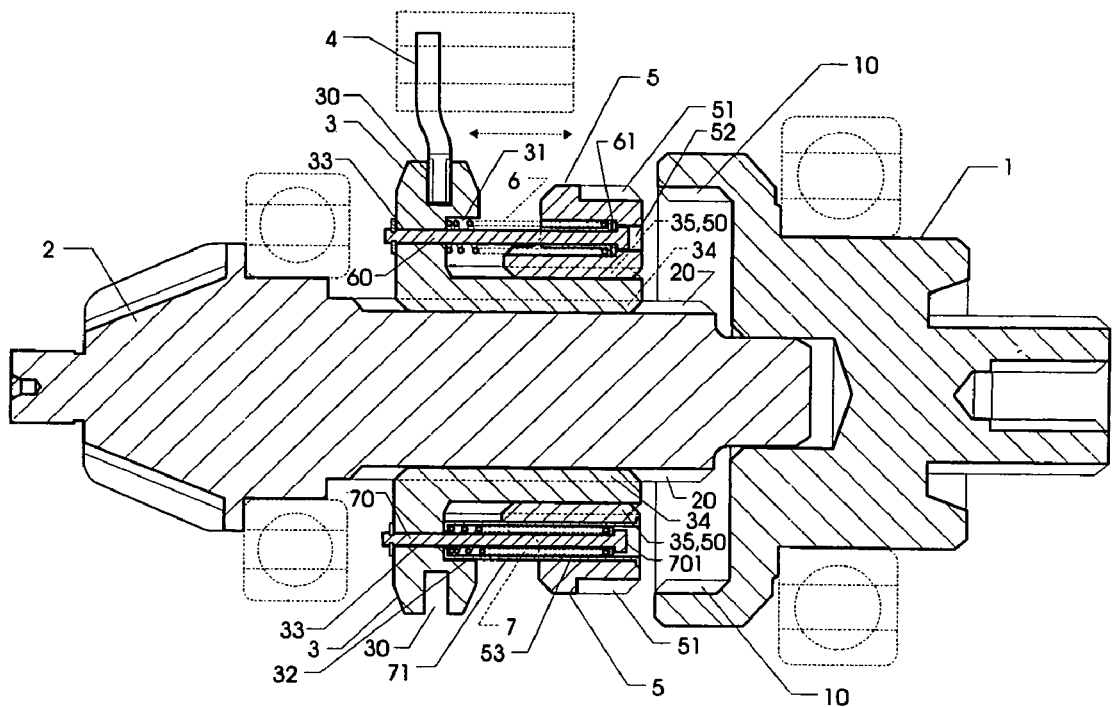
FIG. 1 is a lateral cross-sectional view of the present invention.
Figure 2:
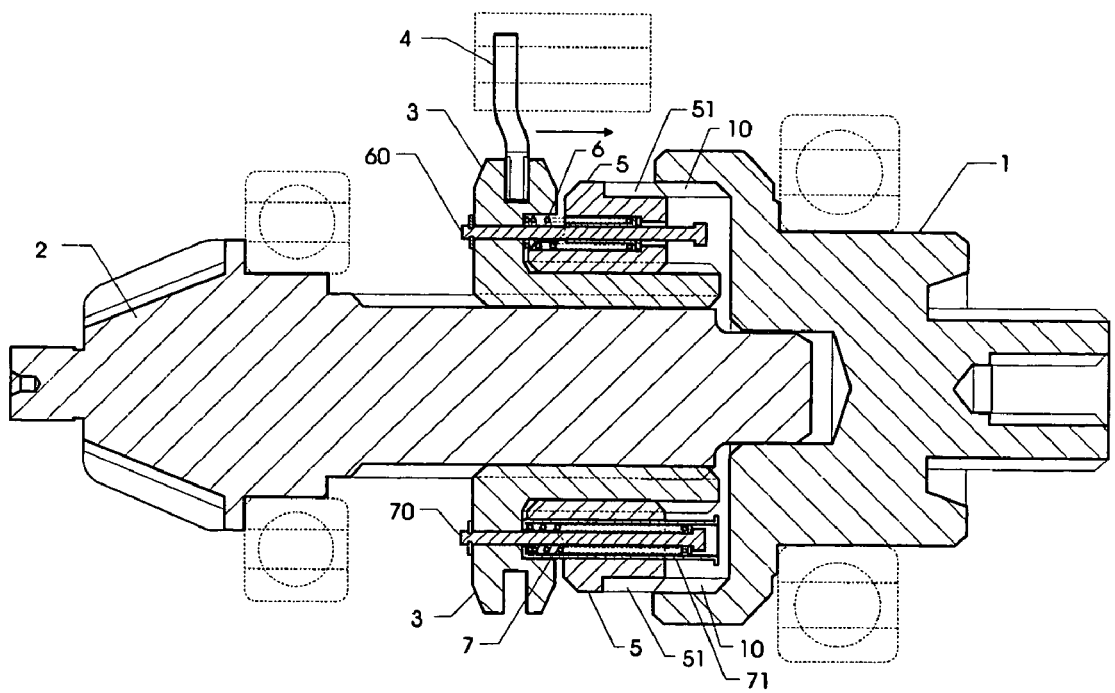
FIG. 2 is a lateral cross-sectional view of the clutch in FIG. 1 wherein the gear portions are not aligned.
Figure 3:
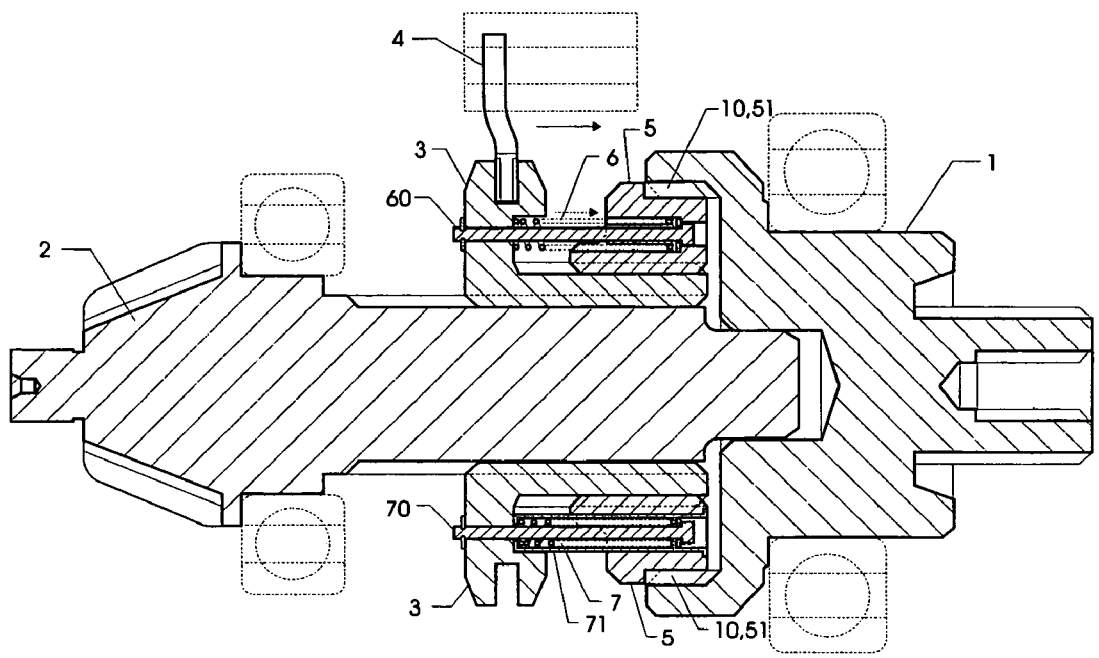
FIG. 3 is a lateral cross-sectional view of the clutch in FIG. 1 wherein the gear portions are engaged.
Figure 4:
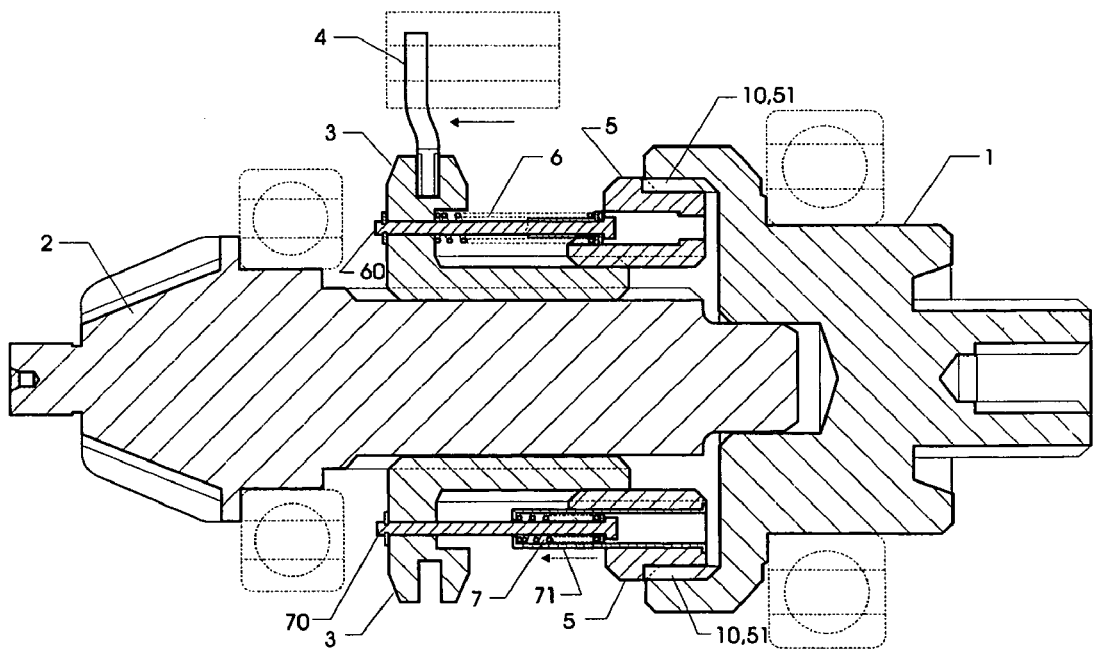
FIG. 4 is a lateral cross-sectional view of the clutch in FIG. 1 wherein the gear portions are about to separate.

Referring to FIG. 5, a preferred embodiment of the present invention as a clutch capable of cushioning forward movement and guarding backward movement comprises a first mandrel 1, a second mandrel 2, a clutch sleeve 3, a driving stick 4, a clutch ring 5, a cushioning springs 6 and a safety springs 7.

The first mandrel 1 further comprises an engagement gear surface 10 formed on the section close to the second mandrel 2 for the engagement with the clutch sleeve 3 mounted on the second mandrel 2. The clutch sleeve 3 is driven by the driving stick 4 to shift longitudinally. The clutch ring 5 is slidably mounted on the clutch sleeve 3, having a cushioning mechanism with the clutch sleeve 3. The safety springs 7 (at least one piece) and the cushioning springs 6 (at least one piece) are included in the cushioning mechanism for slowing down the engagement between the clutch ring 5 and the engagement gear surface 10 on the first mandrel 1 when the clutch sleeve 3 is driven by the driving stick 4 but they are not precisely aligned.

On the other hand, when the driving stick 4 on the clutch sleeve 3 is driven to restore the initial configuration wherein the clutch ring 5 will depart from the engagement gear surface 10 on the first mandrel 1, the safety springs 7 will pull backward to assist the backward movement of the clutch ring 5, if the clutch ring 5 has a problem to go back.

Referring to FIGS. 5 to 8, the clutch sleeve 3 of the present invention is provided with a ring groove 30 for retaining the driving stick 4 and a plurality of retaining rings 31 for fixing the cushioning springs 6. In this preferred embodiment, there are three such retaining units for the cushioning springs 6; but the number is flexible. There are further same number of retaining rings 32 as the safety springs 7 in the clutch sleeve 3. The retaining rings 31 and 32 are respectively provided with through holes 33 for housing the positioning axles 60 and 70 for the cushioning springs 6 and the safety springs 7. The inner wall of the clutch sleeve 3 is provided with gear strips 34 for the engagement with the engagement grooves 20 on the second mandrel 2. Further, the outer wall of the clutch sleeve 3

Figure 9:
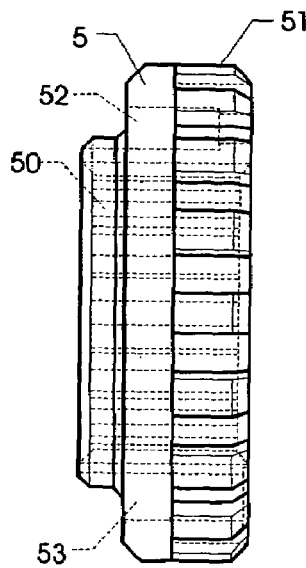
FIG. 9 shows the clutch ring of the present invention.
Figure 10:
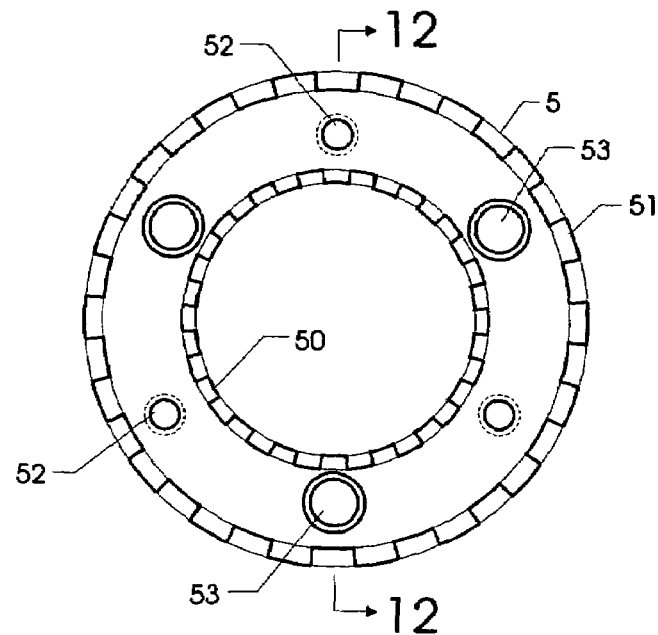
FIG. 10 is a right side view of the clutch ring in FIG. 9.
Figure 12:
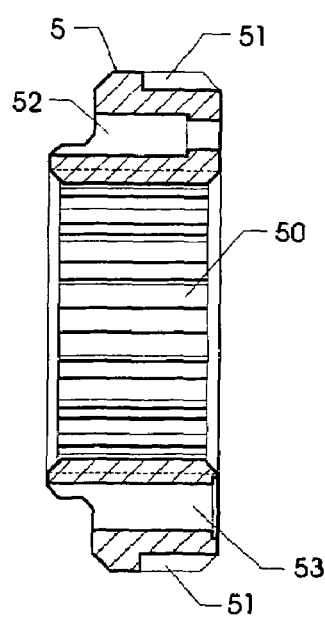
FIG. 12 is the 12-12 lateral cross-section of the clutch ring in FIG. 10.
Figure 11:
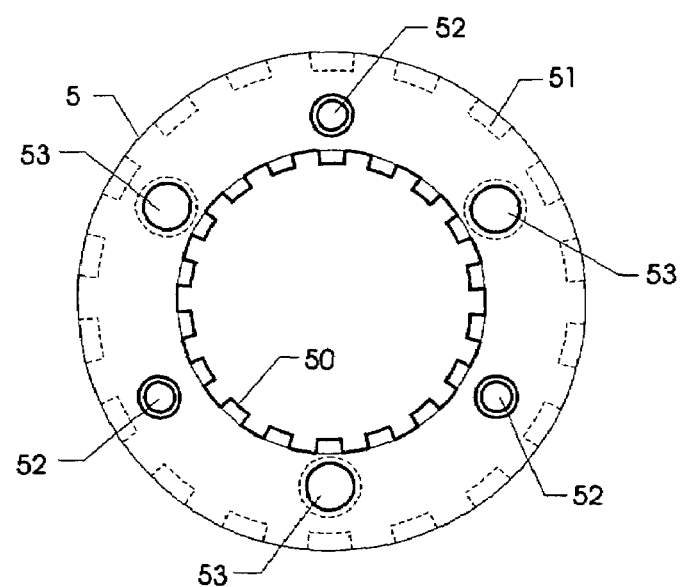
FIG. 11 is a left side view of the clutch ring in FIG. 9.

Referring to FIGS. 9 to 11, the clutch ring 5 of the present invention is further provided with gear strips 50 on the inner wall thereof engaged with the engagement slots 35 on the outer wall of the clutch sleeve 3. The outer wall of the clutch ring 5 is provided with an engagement gear surface 51 for engaging the engagement gear surface 10 on the first mandrel 1. The clutch ring 5 is further provided with same number of retaining ring 32 as the cushioning springs 6 and same number of retaining holes 53 as the safety springs 7. In this preferred embodiment, there are three such holes for the cushioning and safety springs 6, 7; but the number is flexible. Further, each of the retaining holes 52 has a coaxial double-diameter inner space for securing a positioning axle 60 therein and at the same time encircling a spring around the axle.

Figure 13:
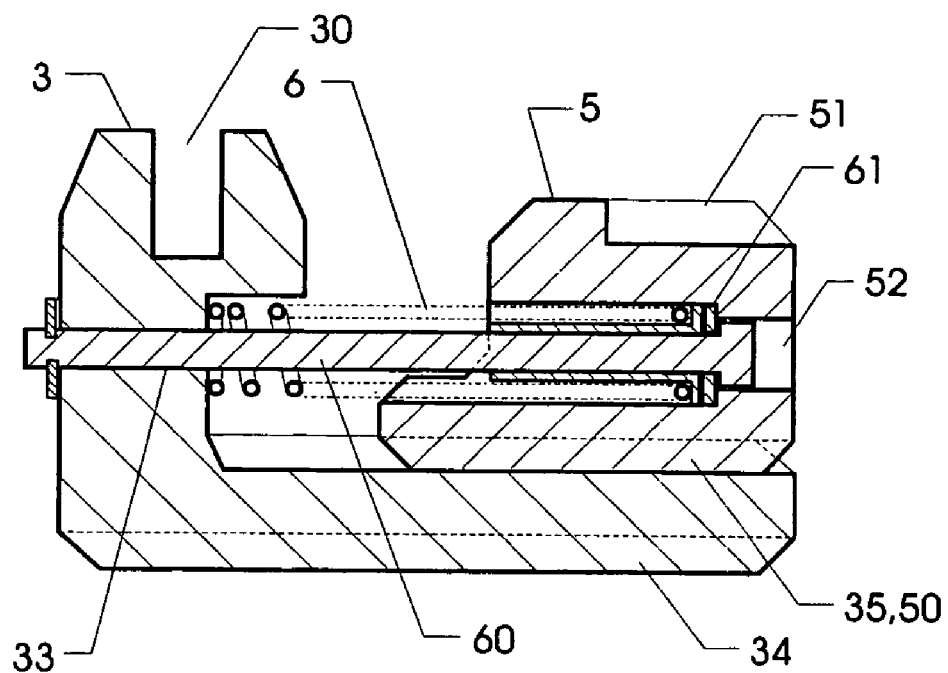
FIG. 13 illustrates the spring for cushioning forward gear engagement disposed between the clutch sleeve and the clutch ring.

Referring to FIG. 13, a preferred embodiment has the cushioning springs 6 disposed between the clutch sleeve 3 and the clutch ring 5, wherein each of the cushioning springs 6 is confined by a corresponding one of the positioning axles 60. One end of each of the cushioning springs 6 is supported against the clutch sleeve 3, and the other end is supported against the retaining holes 52 of the clutch ring 5 with a gasket 61. Thereby, when the clutch sleeve 3 is moving forward whereas the clutch ring 5 is not, the cushioning springs 6 will automatically urge the clutch ring 5 forward to be coupled with the clutch sleeve 3.

Figure 14:
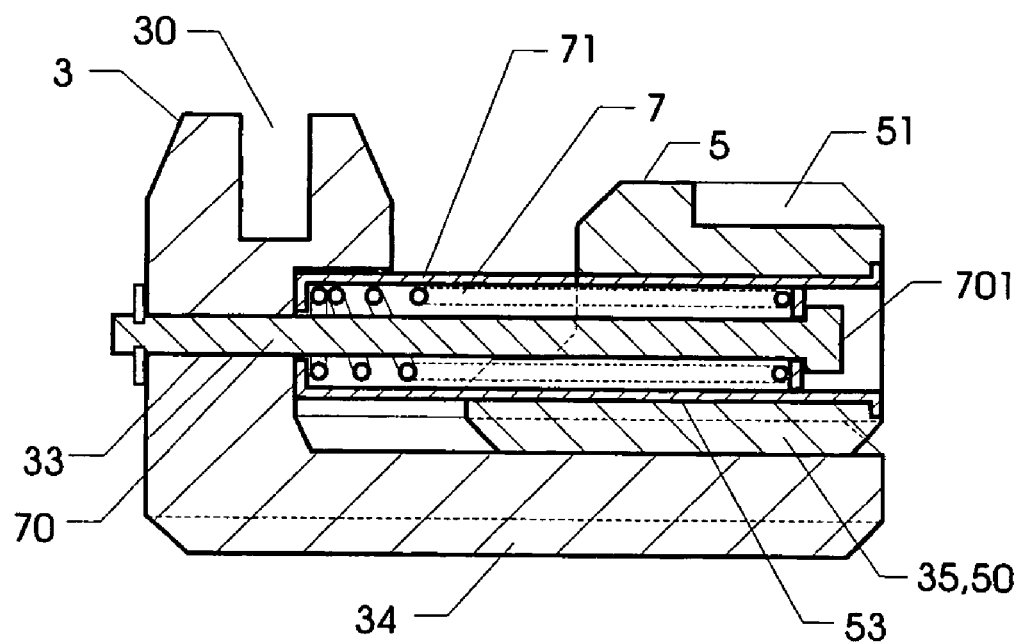
FIG. 14 illustrates the spring for securing backward restoring movement disposed between the clutch sleeve and the clutch ring.

Referring to FIG. 14, a preferred embodiment has the safety springs 7 and the associated positioning axle 70 disposed between the clutch sleeve 3 and the clutch ring 5. One end of each of the positioning axle 70 is fixed on the clutch sleeve 3. Each of the safety springs 7 is encircled around a corresponding positioning axle 70, on which a cylindrical housing 71 is covered. Thereby, when the clutch sleeve 3 is moving forward whereas the clutch ring 5 is not, the cushioning springs 6 will automatically urge the clutch ring 5 forward to be coupled with the clutch sleeve 3. One end of each of the safety springs 7 is supported against the inner wall on one end of a corresponding cylindrical housing 71, and the other end is supported against the terminal flange 701 of a corresponding cylindrical housing 71. The cylindrical housings 71 are mounted around the retaining holes 53 of the clutch ring 5, so that the safety springs 7 will be compressed in the cylindrical housings 71 when the clutch sleeve 3 is moving backward whereas the clutch ring 5 is not. The safety springs 7 will automatically urge the clutch ring 5 backward to be coupled with the clutch sleeve 3.

Thereby, the present invention has the following advantages of:
1. structural simplicity for lowering the cost;
2. small size and being easy to assemble;
3. having a cushioning mechanism that prevents damages to transmission components when gear wheels cannot be engaged or separated; and
4. assuring safe operations of the components, therefore being more durable.

The present invention is thus described, and it will be obvious that the same may be varied in many ways. Each of the components can be operated utilized independently and express its unique function. The components can be combined to express their expected functions. Therefore, the various components can be used independently and in combination. Such variations are not to be regarded as a departure from the spirit and scope of the present invention, and all such modifications as would be obvious to one skilled in the art are intended to be included within the scope of the following claims.

What is claimed is:

1. A clutch capable of cushioning forward movement and guarding backward movement, comprising:
   a first mandrel further comprising an engagement gear surface on one end thereof;
   a second mandrel;
   a clutch sleeve mounted on an end section of said second mandrel close to said first mandrel;
   a driving stick driving said clutch sleeve to move longitudinally;
   a clutch ring slidably mounted on said clutch sleeve for engaging the engagement gear surface of the first mandrel, having a cushioning mechanism with said clutch sleeve;
   cushion springs disposed in said cushioning mechanism for facilitating the engagement between said clutch ring and said engagement gear surface on said first mandrel when said clutch sleeve and said clutch ring are not precisely aligned due to a driving stick shift; and
   safety springs disposed in said cushioning mechanism for facilitating the disengagement between said clutch ring and said engagement gear surface on said first mandrel when said clutch sleeve and said clutch ring are not precisely aligned due to a driving stick shift; and
   wherein said clutch sleeve is further provided with a ring groove for securing said driving stick and retaining holes for said cushioning springs and retaining holes for said safety springs; each of said retaining holes being provided with through holes for positioning axles for said cushioning springs and said safety springs; a plurality of engagement strips being formed on an inner wall of said clutch sleeve for engaging a plurality of engagement slots on said second mandrel; said clutch sleeve further having a plurality of engagement slots on an outer wall thereof for engaging said clutch ring.

2. The clutch capable of cushioning forward movement and guarding backward movement of claim 1 wherein a plurality of engagement strips are formed on an inner wall of said clutch ring for engaging an outer wall of said clutch sleeve; said clutch ring further having an engagement gear surface on an outer wall of said clutch ring for engaging said engagement gear surface on said first mandrel; said clutch ring being further provided with retaining boles for said cushioning springs and retaining holes for said safety springs; said retaining holes having a coaxial double-diameter inner space.

3. The clutch capable of cushioning forward movement and guarding backward movement of claim 1 wherein each of said positioning axles of said cushioning springs and said safety springs has one end fixed on said clutch sleeve, whereby one end of each of said cushioning springs supports against said clutch sleeve and a second end supports against a corresponding retaining hole on said clutch ring.

4. The clutch capable of cushioning forward movement and guarding backward movement of claim 1 wherein each of said positioning axles of said safety springs has one end fixed on said clutch sleeve; a cylindrical sleeve covering each of said safely springs; one end of each of said safety springs supporting against an inner wall of said cylindrical sleeve and a second end thereof supporting against a terminal flange of said positioning axle.

* * * * *